United States Patent

Koseoglu

(10) Patent No.: US 8,863,518 B2
(45) Date of Patent: Oct. 21, 2014

(54) PROCESS FOR THE GASIFICATION OF WASTE TIRES WITH RESIDUAL OIL

(75) Inventor: Omer Refa Koseoglu, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 615 days.

(21) Appl. No.: 12/924,491

(22) Filed: Sep. 27, 2010

(65) Prior Publication Data

US 2012/0073292 A1    Mar. 29, 2012

(51) Int. Cl.
 *F01K 13/00* (2006.01)
 *C01B 3/36* (2006.01)
 *C10J 3/46* (2006.01)
 *B01J 8/00* (2006.01)

(52) U.S. Cl.
 CPC ............................ *F01K 13/00* (2013.01)
 USPC ............... 60/645; 48/197 R; 422/627

(58) Field of Classification Search
 USPC ............. 48/197 R; 60/645–681; 252/373; 422/625–629
 See application file for complete search history.

(56) References Cited

U.S. PATENT DOCUMENTS

| | | | |
|---|---|---|---|
| 4,074,981 A * | 2/1978 | Slater ........................ 48/197 R |
| 4,099,382 A * | 7/1978 | Paull et al. ...................... 60/648 |
| 4,205,963 A * | 6/1980 | Marion et al. .............. 48/197 R |
| 4,332,700 A | 6/1982 | Munih |
| 4,338,099 A | 7/1982 | Crouch et al. |
| 4,563,194 A | 1/1986 | Simon |
| 4,726,530 A * | 2/1988 | Miller et al. .................... 241/19 |
| 5,251,433 A * | 10/1993 | Wallace ......................... 60/775 |
| 5,347,068 A | 9/1994 | Rabe et al. |
| 5,364,996 A * | 11/1994 | Castagnoli et al. ........... 585/241 |
| 6,979,384 B2 | 12/2005 | Yasue et al. |
| 7,451,591 B2 | 11/2008 | Wakefield et al. |
| 2007/0051043 A1 | 3/2007 | Schingnitz et al. |
| 2007/0051044 A1 | 3/2007 | Holle et al. |
| 2007/0254966 A1 * | 11/2007 | Eskin et al. ................... 518/702 |
| 2008/0256860 A1 | 10/2008 | Von Kossak-Glowczewski |
| 2008/0262111 A1 * | 10/2008 | Ploeg et al. ................... 518/704 |

* cited by examiner

*Primary Examiner* — Christopher Jetton

(74) *Attorney, Agent, or Firm* — Abelman, Frayne & Schwab

(57) ABSTRACT

A process for the production of a synthesis gas containing hydrogen and carbon monoxide utilizes shredded waste tires that are substantially free of metal particles as a feedstream, either alone or in combination with a residual oil feedstream, for gasification in the combustion chamber of a tubular wall membrane partial oxidation gasification reactor in the presence of a predetermined amount of oxygen. Optionally, the product synthesis gas is introduced as the feedstream to a water gas shift reactor to enhance the hydrogen content of the final product stream.

17 Claims, 4 Drawing Sheets

PROCESS FOR THE GASIFICATION OF WASTE TIRES WITH RESIDUAL OIL

FIELD OF THE INVENTION

This invention relates to processes for the recovery of hydrocarbons by the partial oxidation in a membrane wall reactor of shredded waste tire material alone or preferably co-processing the waste tire material with residual oil from a refinery process.

BACKGROUND OF THE INVENTION

Gasification is well known in the art and it is practiced worldwide with application to solid and heavy liquid fossil fuels, including refinery bottoms. The gasification process converts carbonaceous materials, such as coal, petroleum, biofuel, or biomass with oxygen at high temperature, i.e., greater than 800° C., into synthesis gas, or syngas, steam and electricity. The syngas can be burned directly in internal combustion engines, or it can be separated or used to produce methanol via synthesis, or converted into synthetic fuels via the Fischer-Tropsch process. There are two reactor types used in gasification: refractory and membrane wall reactors. The latter process requires solid particles in the feedstock and therefore is applied to solid fuels only.

Gasification uses partial oxidation to convert any carbon contained in a feedstock into synthesis gas consisting of carbon monoxide (CO) and hydrogen which in turn can be used in the manufacture of various chemicals ranging from fertilizers to liquid fuels or petrochemicals. According to the desired end product, the gasification process unit or block incorporates several technologies.

For refining applications, the main process block is known as the Integrated Gasification Combined Cycle (IGCC), which converts the feedstock into hydrogen, power and steam. FIG. 1 shows the process flow diagram of a conventional IGCC of the prior art. The IGCC is a complex integrated process, consisting of sections, including feed line 101 and feed preparation 102, air separation unit 180 with oxygen feed 103, gasification reactor 104 producing syngas 106, syngas quench and cooling unit 110, with generated steam 112 and cooled syngas 114 passing to water gas shift reactor 120, acid gas removal (AGR) and sulfur recovery unit (SRU) 130 for treatment of shift gas 122 and separation of carbon dioxide 136 and sulfur 138, high hydrogen syngas recovery 132 and/or gas (WGS) turbine feed 134, and a combined cycle package including gas turbine 140 with air feed 142 for producing electricity 144 and a high pressure discharge 146, a heat recovery steam generator (HRSG) 150 receiving steam 116 and boiler feed water 152 and producing steam 154 and boiler feed 156 for delivery to cooling unit 110, and steam turbine 160 for producing electricity 162.

The air separation unit 180 and most of the downstream processes utilize mature technologies with high on-stream reliability factors. However, the gasifier 104 has a relatively limited lifetime that can be as short as from 3 to 18 months, depending upon the characteristics of the feed and the design of the unit.

Three principal types of gasifier technologies are moving bed, fluidized bed and entrained-flow systems. Each of the three types can be used with solid fuels, but only the entrained-flow reactor has been demonstrated to process liquid fuels. In an entrained flow reactor, the fuel and oxygen and steam are injected at the top of the gasifier through a co-annular burner. The gasification usually takes place in a refractory-lined vessel which operates at a pressure of about 40-60 bar and a temperature in the range of from 1300°-1600° C.

For production of liquid fuels and petrochemicals, the key parameter is the $H_2/CO$ ratio of the dry syngas. This ratio is usually between 0.85 and 1.2 depending upon the feedstock characteristics. Thus, additional treatment of the syngas is needed to increase this ratio up to 2 for Fischer-Tropsch applications or to convert CO to hydrogen through the water gas shift reaction represented by $CO+H_2O = CO_2+H_2$. In some cases, part of the syngas is burned together with some off gases in a combined cycle to produce power and steam. The overall efficiency of this process is between 44% and 48%.

The major benefits for a refinery using a heavy residue gasification process are that it provides a source of hydrogen for hydroprocessing to meet the demand for light products; it produces power and steam for refinery use or for export and sale; it can take advantage of efficient power generation technology as compared to conventional technologies that combust heavy residue; and it produces lower pollutant emissions as compared to conventional technologies that combust heavy residues for disposal. Furthermore, the process provides a local solution for heavy residue where produced, thus avoiding off-site transportation or storage; it also provides the potential for disposal of other refinery waste streams, including hazardous materials; and a potential carbon management tool, i.e., a $CO_2$ capture option is provided if required by the local regulatory system.

Gasification technology has a long history of research and development, and several units are already under operation worldwide. For refining applications, it is particularly recommended in some cases where hydrogen is needed for hydroprocessing and natural gas is not available, and the prices of the feed used for gasification are very low. This is usually the case in refineries where full conversion is required to meet the demand of cleaner light products, such as gasoline, jet fuel and diesel transportation fuels.

The gasifier conventionally uses refractory liners to protect the reactor vessel from elevated temperatures that range from 1400° to 1700° C., corrosive slag and thermal cycling. The refractory is subjected to the penetration of corrosive components from the syngas and slag and thus subsequent reactions in which the reactants undergo significant volume changes that result in strength degradation of the refractory materials. The replacement of refractory linings can cost several millions of dollars a year and several weeks of downtime for a given reactor. Up until now, the solution has been the installation of a second or parallel gasifier to provide the necessary capacity, but the undesirable consequence of this duplication is a significant increase in the capital costs associated with the unit operation.

Research has been reported that is directed to means that will increase the useful life of the gasifier refractory material and thus increase the economic competitiveness of the gasification process. This includes new refractory materials and new technologies such as membrane reactors which are expected to have high reliability and high availability compared to that of conventional lined refractory reactors.

Membrane wall gasifier technology uses a cooling screen protected by a layer of refractory material to provide a surface on which the molten slag solidifies and flows downward to the quench zone at the bottom of the reactor. The advantages of the membrane wall reactor include reduced reactor dimensions as compared to other systems and elimination of the need to have a parallel reactor to maintain continuous operation as in the case of refractory wall reactors; the on-stream time for a typical refractory wall reactor is 50%, therefore a parallel unit is required; however, the on-stream time for membrane wall reactors is 90% and there is no need for a second, parallel reactor; and the build-up of a layer of solid and liquid slag provides self-protection to the water-cooled wall sections.

The build-up of a layer of solidified mineral ash slag on the wall acts as an additional protective surface and insulator to minimize or reduce refractory degradation and heat losses through the wall. Thus the water-cooled reactor design avoids what is termed "hot wall" gasifier operation, which requires the construction of thick multiple-layers of expensive refractories which will remain subject to degradation. In the membrane wall reactor, the slag layer is renewed continuously with the deposit of solids on the relatively cool surface. Further advantages include short start-up/shut down times; lower maintenance costs than for the refractory type reactor; and the capability of gasifying feedstocks with high ash content, thereby providing greater flexibility in treating a wider range of coals, petcoke, coal/petcoke blends, biomass co-feed, and liquid feedstocks.

There are two principal types of membrane reactor designs that are adopted for processing of solid feedstocks. One such reactor uses vertical tubes in an up-flow process equipped with several burners for solid fuels, e.g., petcoke. A second solid feedstock reactor uses spiral tubes and down-flow processing for all fuels. For solid fuels, a single burner having a thermal output of about 500 MWt has been developed for commercial use.

In both of these reactors, the flow of pressurized cooling water in the tubes is controlled to cool the refractory and ensure the downward flow of the molten slag. Both systems have demonstrated high utility with solid fuels, but not with liquid fuels.

Waste tire processing for environmental reasons and for the value of the recovered hydrocarbons has been undertaken for many years. In the United States, approximately one waste tire is discarded per capita on an annual basis. The discarded tires numbered approximately 242 million nationwide in the US during 1990, exclusive of retreads. Approximately 100,000 tons of waste tires have been discarded annually in Saudi Arabia. This accounts for a substantial quantity of hydrocarbons since each tire weighs about 20 lb. In addition to their hydrocarbon content, these waste tires increase environmental concerns since they are typically disposed of in landfills or accumulate in piles in tire storage areas. Whole waste tires are difficult to dispose of in landfills; they tend to emit gas, harbor rodents and insects, and will move upward in the landfill over time as other wastes consolidate and subside.

Pyrolysis, liquefaction, and gasification are disposal/recovery technologies that have been applied, or considered for application, to different wastes with varied success. These processes have the potential for recovering usable resources, i.e., energy, chemical feedstocks, steel and fibers from waste tires.

Of these three technologies, pyrolysis has been the most commonly applied. Entrepreneurs and major industrial firms, including tire manufacturers, as well as governmental entities worldwide have invested an estimated $100 million in waste tire decomposition projects.

Several commercial-scale pyrolysis or gasification facilities are currently operating in the United States. Although offering the prospect of substantial financial returns, the tire decomposition projects have not been entirely successful because of operating problems, unsafe and dangerous conditions, lack of an adequate supply of suitable feedstock, poor product quality, lack of adequate environmental controls and high operational costs.

Pyrolysis involves heating organic materials without oxygen to break them down to simpler organic compounds. When organic wastes, e.g., waste tires are the feedstock, products of the process include carbon char, oil and gas. Pyrolysis can convert wood to charcoal and a low-btu gas.

The gasification of organic materials is conducted under operating conditions that are between the complete absence of oxygen and a predetermined or calculated stochiometric volume that is sufficient to complete the oxidation reaction. Gasification involves drying and pyrolyzing a feedstock, and oxidizing the solid char to heat the reaction and produce carbon monoxide (CO) in the exiting product gas stream.

Liquefaction is the thermochemical conversion of an organic solid into a petroleum-like liquid. Liquefaction typically involves the production of a liquid composed of heavy molecular compounds from a pyrolytic gas stream. The liquid has properties that are similar, but not identical, to those of petroleum-based fuels. Liquefaction can be described as the manipulation of the pyrolysis process in order to produce a liquid having characteristics similar to petroleum-based liquids.

It is an object of this invention to provide a process for the disposal of waste tires that is reliable, energy-efficient and environmentally acceptable and that is capable of producing products that can be used as a feedstream for other processes in the same refinery.

SUMMARY OF THE INVENTION

This invention comprehends a process for gasification of shredded tire waste material in a membrane wall reactor. The waste tire material can be introduced into the membrane wall reactor alone as the sole feedstock for gasification, or as a feedstock component along with a liquid hydrocarbon, e.g., residual oil, for gasification. The waste tire particles are preferably introduced in the form of a free-flowing fluidized feedstream into the combustion chamber of a tubular wall membrane partial oxidation gasification reactor in the presence of a predetermined amount of oxygen, or oxygen-containing gas, e.g., air.

1. Processing of the Waste Tires

Automotive tires are constructed using braided wire to form the central sealing rims and commonly also include wire bands in the tire body beneath the treads. Various processes well known in the art have been developed to remove these metal components from waste or scrap tires. These processes include thermal, mechanical, combined cryogenic-mechanical and cryogenic systems. Representative processes are described in U.S. Pat. No. 4,332,700, U.S. Pat. No. 6,979,384 and U.S. Pat. No. 4,726,530. In the practice of the present process, it is desirable to remove the metal from the tire bodies. The metal content of shredded tire material in the feedstock to the membrane reactor is preferably less than 0.1 weight percent based on the weight of the shredded material.

After removal of the metal components, the remaining tire body is processed to reduce it to a particulate form that is within a desired particle size range. The shredded tire material can include very fine particles, i.e., "dust", when it is introduced into the reactor either alone or with oil or other liquid(s). The shredded tire material preferably passes a 35 mesh Tyler screen.

The determination of the size of the particles is based, at least in part, on the design and mode of operation of the membrane reactor. For example, coldwall membrane reactors suitable for use in the present invention are adapted to receive pressurized feedstocks that contain solid materials through a nozzle or jet device. The gases produced by the partial oxidation of the feedstock, fuel and limited oxygen introduced into the reactor combustion chamber contact the water-cooled tubular side walls and the vaporized slag is condensed and forms a layer which partially solidifies on a relatively thin refractory coating applied to the tubes, the remaining molten slag flows downwardly under the force of gravity to the lower end of the walls where it collects and is eventually removed from the reactor.

2. Mixed Feedstream of Tire Particles and Oil

In another preferred embodiment of the invention, the waste tire particles are introduced into the membrane reactor with residual oil from a local or associated refinery process. It is desirable to mix the waste tire particles with the oil so that they are introduced as a feedstock of uniform consistency and content. This mode of operation assures a more uniform combustion or partial oxidation of the components and the development of the ash that leads to the formation of solid and liquid slag upon contact with the cooler walls. The liquid slag formed from the ash contacting the relatively cooler wall runs down the solid slag layer as a film of liquid slag and leaves the gasification space together with the gasification gas. The slag provides thermal insulation between the reactor wall and the cooling channels.

In order to obtain an intimate and uniform mixture of the waste tire particles and the residual oil, the two components are introduced into a mixing vessel. The vessel can be equipped with a circulation device, such as an impeller. The circulation device can also include a pump to move the liquid from the bottom of the vessel to the top. Suitable mixing and circulation devices are well known in the art.

The uniform mixture of particles in oil can be maintained in a stirred vessel and withdrawn as needed by pumping the fluid mixture to the required pressure for introduction into the pressurized membrane reactor. In order to maintain the proper stoichiometric ratio of feedstock, fuel and oxygen, the waste tire and oil composition is periodically analyzed and the respective flow rates controlled by appropriate and well known automated systems of meters, pumps and pressure regulating devices, all of which are within the skill of the art.

The amount of ash required to optimize the performance and useful life of a given reactor can be determined experimentally using ASTM Method D-482, or by an experienced operator during use of the reactor.

In another embodiment of the invention, the waste tire particles are mixed with water to form a uniform pumpable slurry that is introduced under pressure into the membrane wall reactor. This embodiment is used when a combustion modifier is required to properly balance the reactants to obtain the desired quality of the syngas.

The solid particulate waste tire material can also be fluidized in a feedstream of air or another oxygen-containing process gas in order to support the combustion required for partial oxidation. The solid particulate material can be maintained in a feed reservoir, e.g., a pressurized hopper and metered, as by a screw conveyer into a conduit through which the pressurized gas stream is passing on its way to the membrane reactor. Other apparatus and systems for producing either a wet or dry fluidized stream of the waste tire particles that are well known to the material handling art can be used. For example, the tire solids can be fed to a high temperature processing vessel without interruption due to bridging and plugging by the solids by passing the solids at a controlled rate from a feed vessel to a first conduit communicating with the feed vessel. The solids are then passed through the first conduit into a second conduit which communicates with the first conduit and the processing vessel, and which contains a scraper for scraping the inside walls of the conduit. The pressure in the feed vessel is maintained at a level higher than the pressure in the processing vessel by passing a sufficient amount of a gas into the feed vessel such that the solids are passed through the second conduit into the processing vessel in a dense phase pneumatic flow as the scraper contacts the inside walls of the second conduit to prevent any bridging or plugging. The scraper can include a wire helix which is rotated inside the second conduit. See for example, U.S. Pat. No. 4,668,130, the disclosure of which is incorporated herein by reference.

3. Sulfur Removal

Automotive tires include elemental sulfur as one of the many ingredients added to the gutta percha or natural latex and compounded by intensive mixing to form an intimate mixture of the relatively soft material used to construct the tire body and other components. During the heating, or vulcanization, of the tire body the sulfur reacts by cross-linking mechanisms and forms the tough hardened rubber.

During the partial oxidation of the waste tire particles in the membrane reactor, gaseous sulfur compounds are formed. These include hydrogen sulfide, carbonyl sulfide and ammonia. The sulfur-containing compounds are undesirable impurities and are removed from the syngas using known conventional processes and apparatus.

BRIEF DESCRIPTION OF THE DRAWINGS

The invention will be described in further detail below and with reference to the attached drawings where the same and similar elements are referred to by the same number, and where.

DETAILED DESCRIPTION OF THE PREFERRED EMBODIMENT

Figure 1:
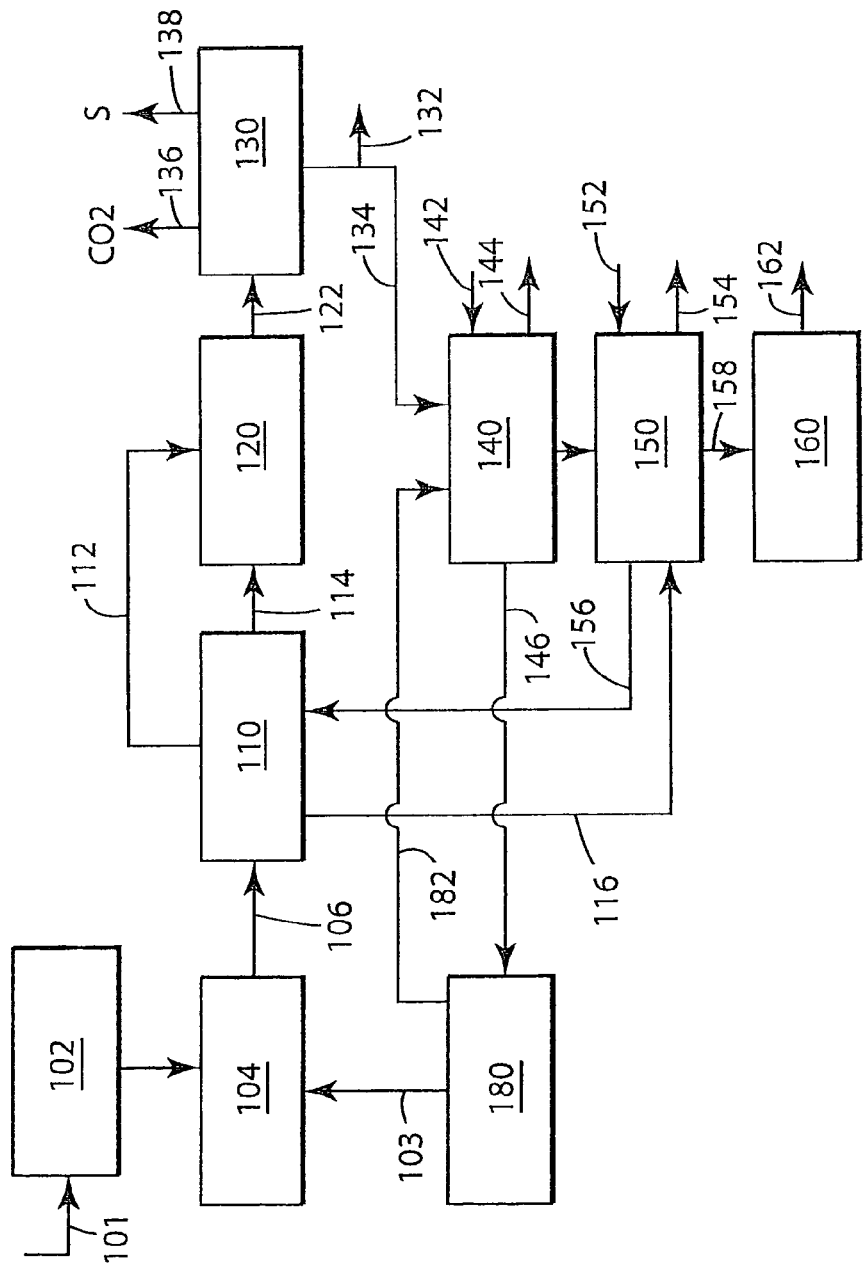
FIG. 1 is a schematic diagram of an integrated gasification combined cycle process of the prior art.
Figure 2:
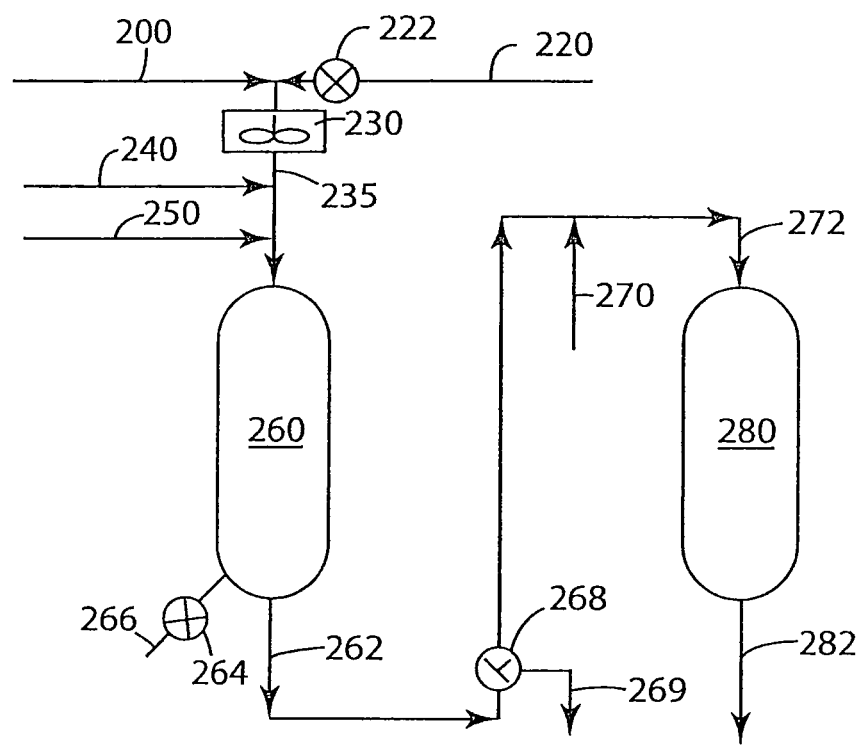
FIG. 2 is a schematic diagram of the integrated process of the present invention for the gasification of waste tire material and a liquid hydrocarbon.

The process of the invention will be further described with reference to the schematic diagram of FIG. 2 where the fluidized feed 200 of shredded waste tire material that is substantially free of metal is introduced into mixing zone 230. A source of liquid hydrocarbon feed 220 passes through regulating control valve 222 and is introduced into mixing zone 230. The uniform mixture of waste tire material and liquid hydrocarbon is introduced into the gasification zone with controlled amounts of oxygen 240 and steam 250. The partial oxidation reaction proceeds in gasification zone 260 in which the ash component contacts the water-cooled sides of the membrane wall reactor to form solid and liquid slag at the surface which is eventually recovered at the base of the gasification zone 260.

The raw syngas 262 is recovered from the gasification zone and may be withdrawn via control valve 264 and stream 266 for use in other downstream processes.

In a preferred embodiment of the present invention, some or all of the syngas passes via three-way control valve 268 to a water gas shift reaction zone 280. Upstream of the WGS reaction zone, steam 270 is mixed with the syngas and introduced via line 272 into reaction zone 280. The shifted syngas product, now having a significantly higher concentration of hydrogen is recovered as product 282. Thus, in accordance with the process of the invention, valuable end products, e.g. syngas and/or hydrogen can be obtained from waste tires and residual oils.

An amine absorption column can be used for the removal of sour gases from the syngas. This process and equipment are commonly used in hydroprocessing. It is noted that carbonyl sulfide is not easily removed by conventional amine treatment methods. Therefore, for deep cleaning, it is recommended that the COS be converted into $H_2S$ by hydrolysis upstream of the amine unit. Ammonia, nitrogen and a small amount of hydrogen cyanide can also be formed in the gasification zone. Ammonia and hydrogen cyanide can be removed, e.g., by water scrubbing.

In a further embodiment of the present invention, the product syngas product stream is introduced as the feedstream for a water gas shift (WGS) reaction in order to increase the volume of hydrogen recovered. In the water gas shift reaction, carbon monoxide reacts with steam at high temperature, and optionally in the presence of one or more catalysts, to yield carbon dioxide and hydrogen in an exothermic reaction. The carbon monoxide and hydrogen can be separated to provide a relatively high purity hydrogen product stream of 95-99.5 V %. In the present process, the carbon monoxide component of the syngas reacts with the water molecules in the steam to produce hydrogen and carbon dioxide in the WGS reactor.

The WGS reactor can be operated in a temperature range of 150° C. to 400° C., but preferably at 200° C. to 350° C., and most preferably at 300° C. to 350° C. The pressure can range from 1 to 60 bars. The water-to-carbon monoxide mole ratio is in the range of from 5-to-1 and preferably in the range of from 3-to-1.

The inclusion of the water gas shift reactor for processing of the syngas obtained from the partial oxidation gasification of the waste tire particles in the tubular wall membrane reactor provides the advantage of an energy efficient and economically operable process for obtaining high quality hydrogen that is derived from waste tires, and optionally a low grade liquid hydrocarbon feedstock.

Figure 3:
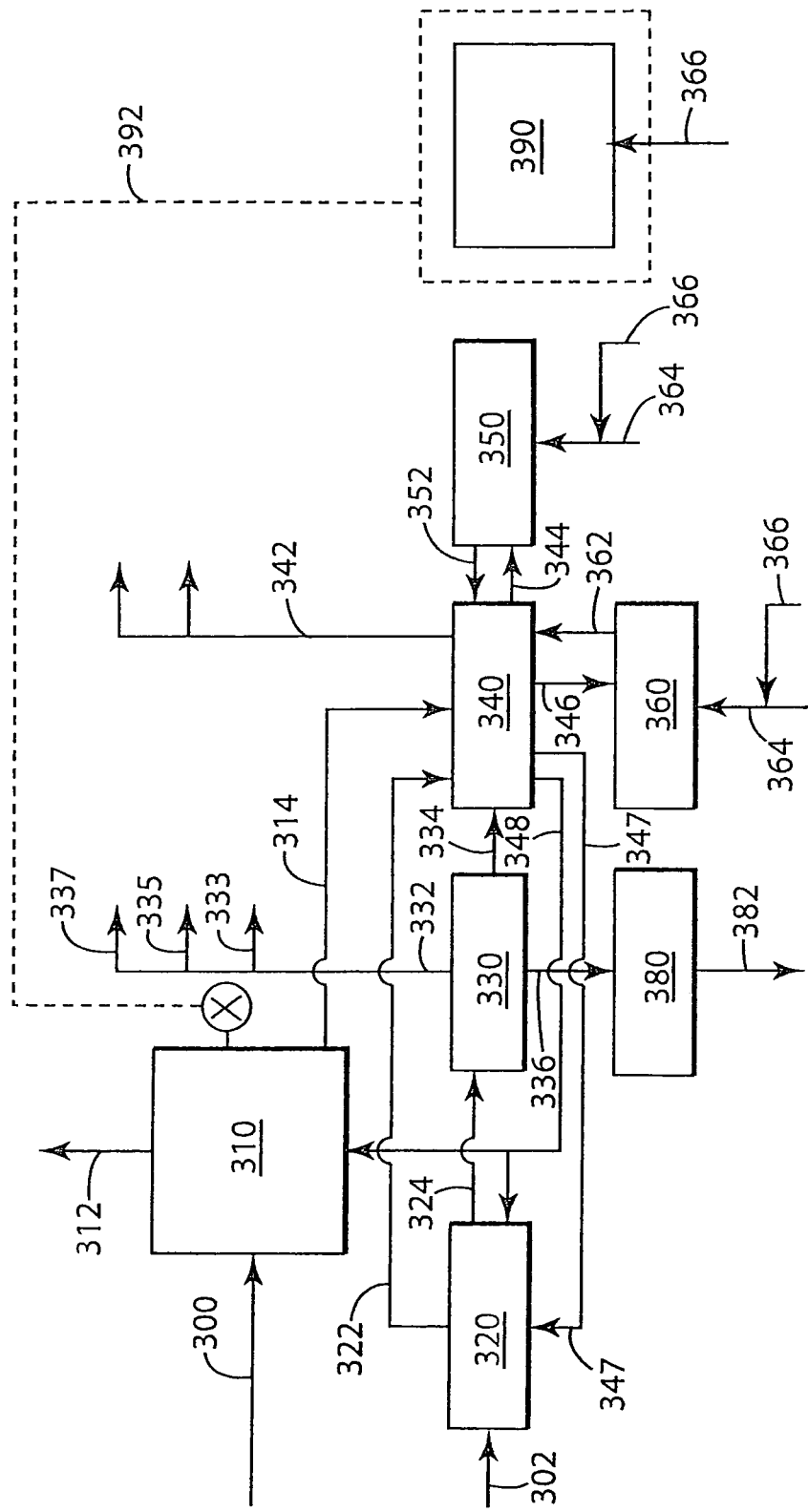
FIG. 3 is a schematic diagram of a amine treatment unit suitable for use in the practice of the process of the present invention.

Referring now to FIG. 3, there is schematically illustrated an amine treating unit suitable for use in the present invention for the removal of sulfur and other contaminants from the syngas product. The process is also referred to as amine sweetening and the product as sweet gas. The contaminants removed include hydrogen sulfide ($H_2S$), mercaptans (RSH), and carbonyl sulfide (COS). These contaminants are typically present in sour gas streams produced in the gas oil hydrodesulfurization (HDS) unit. Gas and LPG from the crude distillation plant also contain these contaminants. The amount of sour contaminants depends on the type of crude oil being processed. Hydrogen sulfide is corrosive, highly toxic, and flammable. Amine solutions have a strong affinity for hydrogen sulfide gas at temperatures of 30-45° C. Amine does not absorb hydrocarbon gases. The amine used in the unit depicted in FIG. 3 is monoethanolamine (MEA), preferably in the form of an 18-20% solution in water. The unit is divided into the following six major sections as described below.

Sour Gas Absorber Section

In the sour gas absorber section 310, sour syngases 300 are treated by countercurrent contact with lean amine solution 348 which absorbs most of the hydrogen sulfide from the sour gas stream. Sweet gas 312 is produced and routed for downstream processes.

LPG Absorber Section

In the LPG absorber section 320, sour LPG 302 is treated by countercurrent contact with lean amine solution 347 which absorbs most of the hydrogen sulfide from the LPG stream.

LPG Scrubber Section

In the LPG scrubber 330, the remaining hydrogen sulfide and mercaptans in the pretreated LPG 324 are removed by caustic soda. The hydrogen sulfide and mercaptans are retained by the spent caustic soda. The sweet LPG 332 is routed to the hydrogen plant 333, the LPG sphere 335, and the vaporizer 337 in crude distillation unit.

Stripper Section

In the stripper section 340, the regeneration of rich or saturated amine 314, 322, 334 into lean amine 347, 348 solution takes place in a stripper column using vapor 362 generated in a reboiler 360 to which is fed steam 364 and boil feed water 366.

Reclaimer Section

The reclaimer 350 recovers MEA 352 as a vapor from the feed 344. The polymerization products which accumulate during regeneration degrade the amine solution. These products are deposited at the bottom of the reclaimer 350 and vaporized MEA 352 is returned to the stripper column 340.

Amine Dilution/Storage Section

In the fresh amine mixing/storage section 390, facilities are provided to mix, store and recover amine solution and to replenish the absorber 310 via line 392.

The invention will be further described in connection with the schematic process diagram of FIG. 2 and the following example that was developed using a simulator model based on stoichometric reaction rates that best fitted the gasifier data. The simulator utilizes data from the elemental analysis of the feedstock, e.g., carbon, hydrogen, sulfur, nitrogen and ash) to predict the gasifier yields. A small portion of the sulfur present is converted to carbonyl sulfide; nitrogen present is converted to nitrogen gas, $N_2$, (about 90%) and ammonia, $NH_3$ (about 10%); and a trace amount of hydrogen cyanide is also formed.

EXAMPLE 1

In this example, the process will be described with reference to FIG. 2. A liquid pitch stream 220 obtained from a solvent deasphalting process and shredded waste tire material 200 obtained after the steel wire has been removed are blended in mixing zone 230. The elemental composition of individual components and the final blend is set forth in Table 1. The pitch-to-waste tire ratio is 2.5, which is sufficient to produce at least about two (2) W % of solids in the feed mixture in order to assure efficient operation of the reactor over an extended period of time.

TABLE 1

| Feedstock Properties | | | |
| --- | --- | --- | --- |
| Stream # | 200 | 220 | 235 |
| Elements\Feedstocks | Tire | Pitch | Blend |
| C, W % | 89.50 | 85.46 | 86.61 |
| H, W % | 7.30 | 8.25 | 7.98 |
| S, W % | 1.90 | 5.5 | 4.47 |
| N, W % | 0.30 | 0.79 | 0.65 |
| O, W % | 0.80 | 0 | 0.23 |
| Ash, W % | 7.10 | 0 | 2.03 |
| MW, kg/kg-mol | 600.00 | 800 | 742.86 |
| | 99.80 | 100 | 99.94 |

A predetermined volume of oxygen 240 or an oxygen-containing gas, and steam 250 are introduced and gasified in the gasification zone of a membrane wall reactor 260. The gasification reactor is operated at 1045° C. The water-to-carbon weight ratio is 0.6 and the oxygen-to-pitch weight ratio is 1.

After the gasification is completed, the raw syngas products 262 are sent with steam 270 from a boiler or a process heat exchanger as feedstream 272 to a water gas shift (WGS) reactor 280 to increase the hydrogen yield in WGS product steam 282. The water gas shift reactor is operated at 318° C., one bar of pressure and a water-to-hydrogen mol ratio of 3. The product yields are summarized in Table 2B.

EXAMPLE 2

Figure 4:
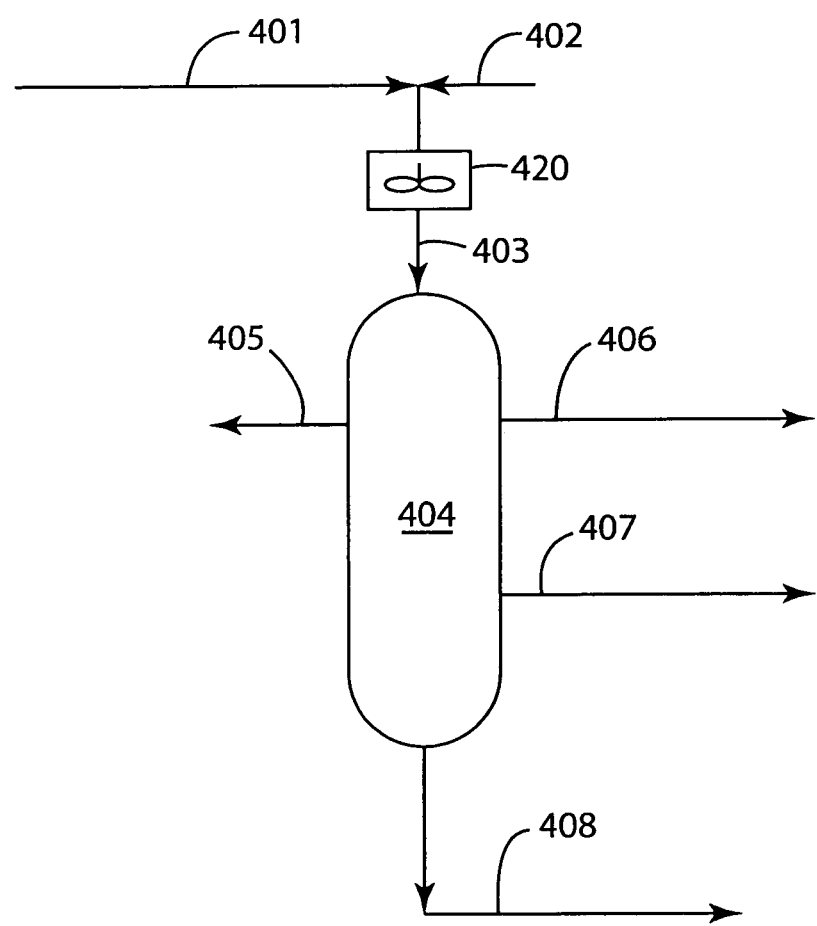
FIG. 4 is a schematic diagram of another embodiment of the invention for the gasification of waste tire material alone.

In this example, no liquid hydrocarbon material is utilized and only the shredded tire particles are gasified. The process will be described by reference to the schematic diagram of FIG. 4 where the waste tire particle stream 401 is fluidized with oxygen or air 402 in a metered mixing chamber 420 and the mixture 403 is introduced in the gasification zone 404 to produce the partial-combustion gases. The gasification zone reactor is operated at 1045° C. The water-to-carbon weight ratio is 0.6:1 and the oxygen-to-pitch (as waste tire material) weight ratio is 1:1. After the gasification, the products are sent to a water gas shift (WGS) reactor to increase the hydrogen yield. The water gas shift reactor is operated at 318° C., 1 bar of pressure and the water-to-hydrogen mol ratio is 3:1. The feedstock properties are set forth in Table 2A.

TABLE 2A

| Feedstock Properties | |
| --- | --- |
| Elements | Tire |
| C, W % | 89.50 |
| H, W % | 7.30 |
| S, W % | 1.90 |
| N, W % | 0.30 |
| O, W % | 0.80 |
| Ash, W % | 7.10 |
|  | 99.80 |

Processing subsequent to gasification is similar to that described above in connection with FIG. 2, to which reference is made and will not be repeated here. Suffice it to say that steam 406, electricity 407 and hydrogen 408 are ultimately derived from the gasifier products. The product yields are summarized in Table 2B, where "WGS" is the water gas shift reactor yields.

TABLE 2B

| | Product Yields | | | |
| --- | --- | --- | --- | --- |
| | Stream # | | | |
| | 401 | 402 | 405 | 408 |
| | Reactor | | | |
| | Gasifier In Kg | Gasifier In Kg | Gasifier In Kg | WGS Out Kg |
| Pitch - Tires | 1000.0 | | | |
| Pitch (HC) | 937.1 | | | |
| Oxygen | | 1000.0 | | |
| H2/CO | | | | |
| CH4 | | | | 6.2 |
| H2 | | | | 225.4 |

TABLE 2B-continued

| | Product Yields | | | |
| --- | --- | --- | --- | --- |
| | Stream # | | | |
| | 401 | 402 | 405 | 408 |
| | Reactor | | | |
| | Gasifier In Kg | Gasifier In Kg | Gasifier In Kg | WGS Out Kg |
| CO | | | | 69.4 |
| CO2 | | | | 3026.0 |
| H2O | | | 512.8 | 1717.4 |
| H2S | | | | 52.5 |
| COS | | | | 10.3 |
| N2 | | | | 14.2 |
| Ar | | | | 0.0 |
| NH3 | | | | 0.8 |
| Total | 1000.0 | 1000.0 | 512.8 | 5122.3 |

The invention has been described with reference to its preferred embodiments and an example and various modifications will be apparent to those of ordinary skill in the art. The scope of protection which is to be accorded the invention is to be determined by the claims that follow.

I claim:

1. An integrated process for the gasification of waste automotive tires in an oil refinery comprising:
   a. preparing the waste tires so that they are substantially free of metal;
   b. shredding the waste tires to produce a free-flowing mass of hydrocarbon-containing particles that are substantially free of metal;
   c. introducing the waste tire particles into a moving fluid feedstream containing residual oil produced in the refinery's operation to form a pressurized fluidized feedstock containing the solid waste tire particles that is a pumpable dispersion;
   d. injecting the fluidized feedstock containing solid waste tire particles in residual oil into the combustion chamber of a tubular wall membrane partial oxidation gasification reactor and introducing into the reactor a predetermined amount of oxygen, where the amount of waste tire particles and oxygen entering the reactor are controlled to provide a stoichiometric balance for partial combustion based on the hydrocarbon content of the waste tire particles;
   e. operating the gasification reactor at a temperature in the range of 900° C. to 1700° C. and a pressure of from 20 to 100 bars;
   f. subjecting the feedstock to partial oxidation to maximize the production of synthesis gas consisting of hydrogen and carbon monoxide, and to produce a slag material;
   g. recovering the hydrogen and carbon monoxide synthesis gas from the reactor;
   h. passing the hot synthesis gas to a water-cooled heat exchanger to cool the synthesis gas; and
   i. recovering high pressure steam from the heat exchanger and introducing the steam into a turbine to produce electricity for use in refinery operations.

2. The process of claim 1 in which a portion of the waste tire particles are fluidized in a gaseous feedstream to supplement the feedstock to the membrane reactor.

3. The process of claim 1 in which the waste tire particles pass a 35 Tyler mesh size.

4. The process of claim 2 in which the gaseous feedstream contains oxygen.

5. The process of claim 4 in which the gaseous feedstream is air.

6. The process of claim 1 in which the ratio of oxygen-to-carbon in the gasifier is from 0.5:1 to 10:1 by weight.

7. The process of claim 6 in which the ratio of oxygen-to-carbon is from 1:1 to 5:1 by weight.

8. The process of claim 7 in which the ratio of oxygen-to-carbon is from about 1:1 to 2:1 by weight.

9. The process of claim 1 which includes introducing steam into a combustion chamber in the ratio of from 0.1:1 to 10:1 by weight of carbon in the feedstock.

10. The process of claim 9 in which the steam is introduced in the ratio of from 0.1:1 to 2:1 b weight of carbon in the feedstock.

11. The process of claim 10 in which the steam is introduced in the ratio of from 0.4:1 to 0.6:1 by weight of carbon in the feedstock.

12. The process of claim 1 which includes subjecting the cooled synthesis gas from step (h) to a water gas shift reaction, recovering a mixed stream of hydrogen and carbon dioxide, and thereafter recovering a product stream of hydrogen.

13. The process of claim 12 in which the water gas shift reaction is conducted in the range of from 150° C. to 400° C. and at a pressure of from 1 to 60 bars.

14. The process of claim 13 in which the water gas shift reaction is maintained at a temperature of from 150° C. to 400° C. and a pressure of from 1 to 60 bars.

15. The process of claim 13 in which the water-to-carbon monoxide mole ratio is 5:1.

16. The process of claim 13 in which the water-to-carbon monoxide mole ratio is at least 3:1.

17. The process of claim 1 in which the ash content is from 2 to 10 W % of the feedstream.

\* \* \* \* \*